R. H. GERARD.
VARIABLE SPEED TRANSMISSION MECHANISM.
APPLICATION FILED DEC. 8, 1911.
1,173,946.
Patented Feb. 29, 1916.
3 SHEETS—SHEET 1.
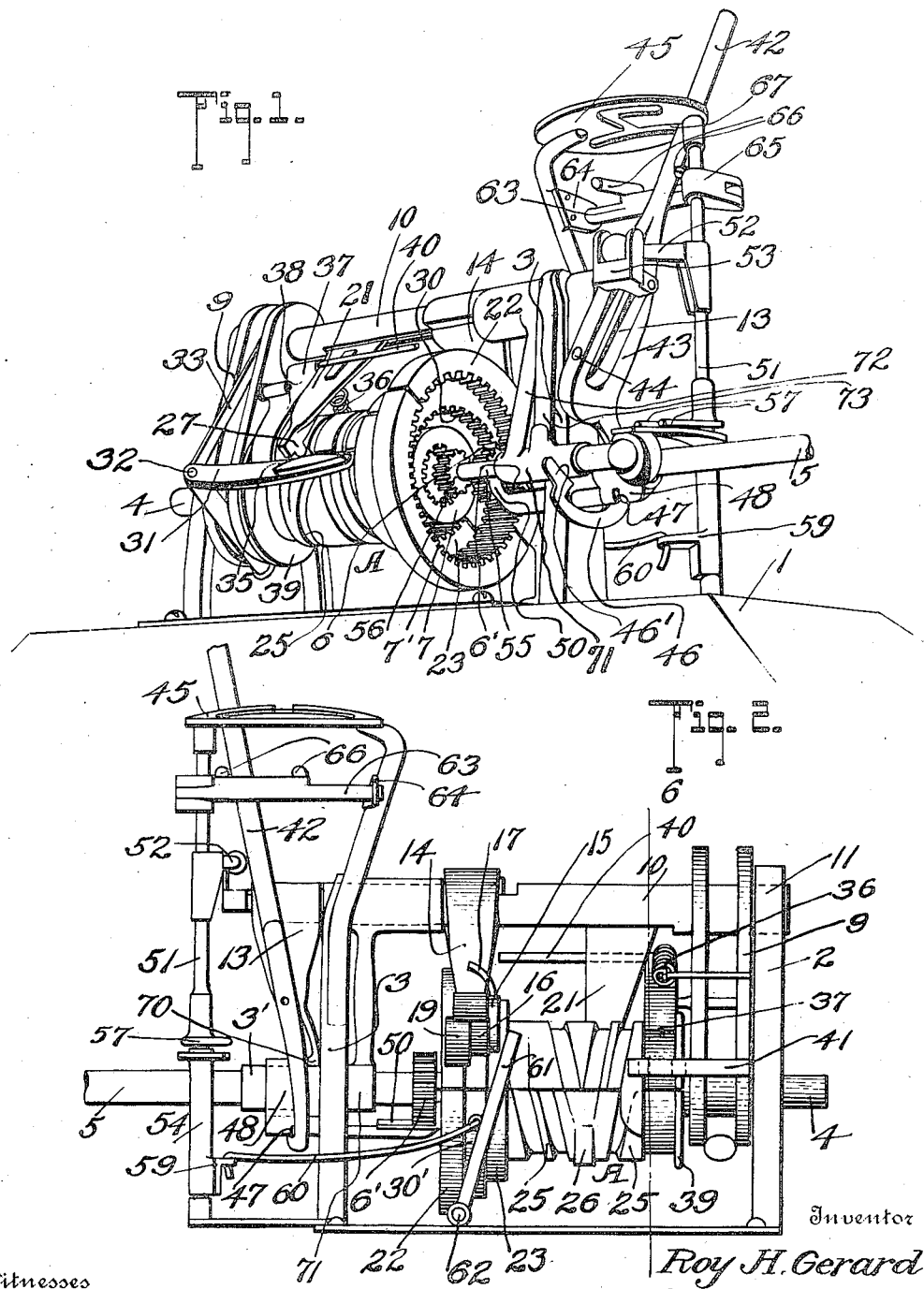

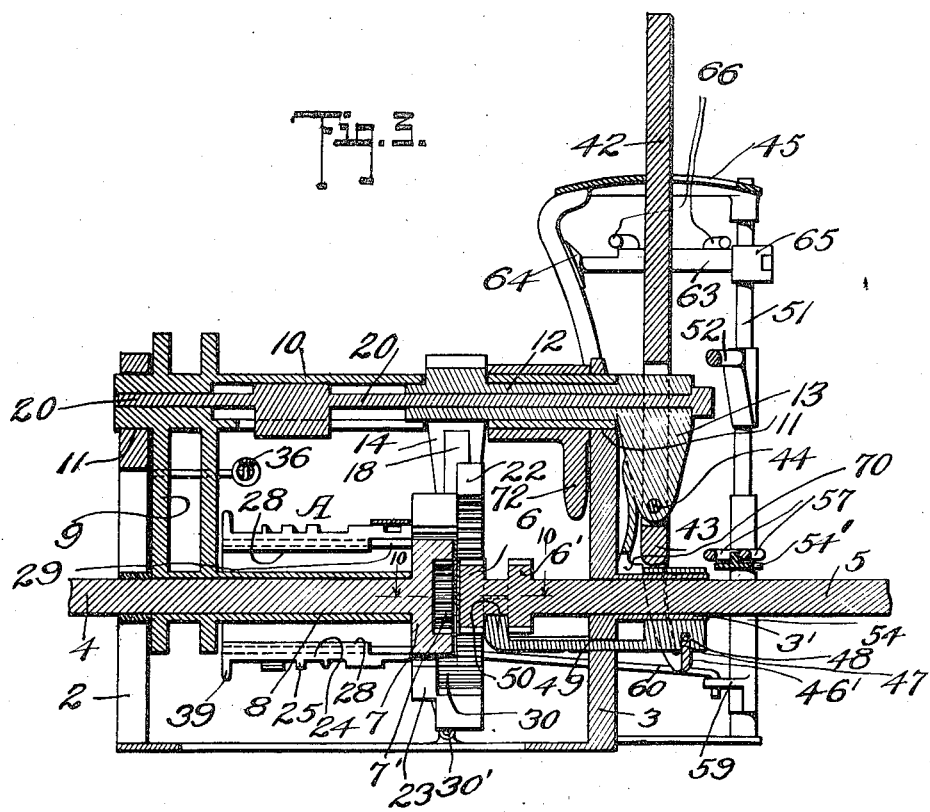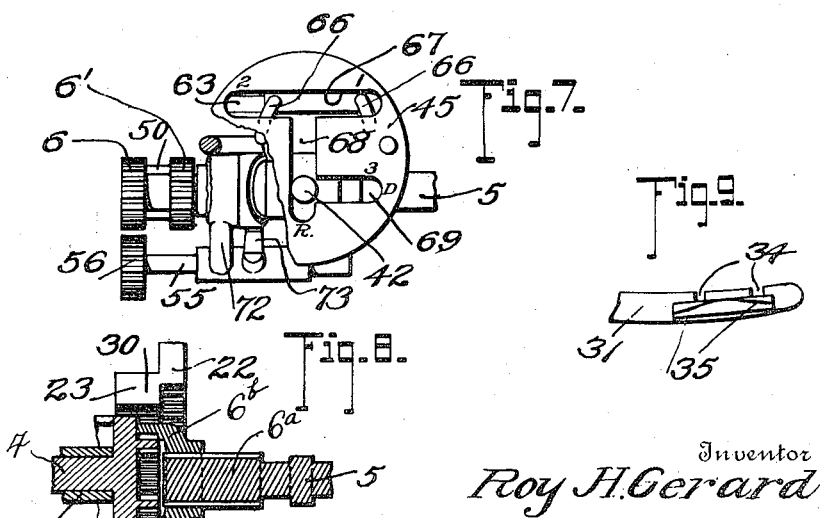

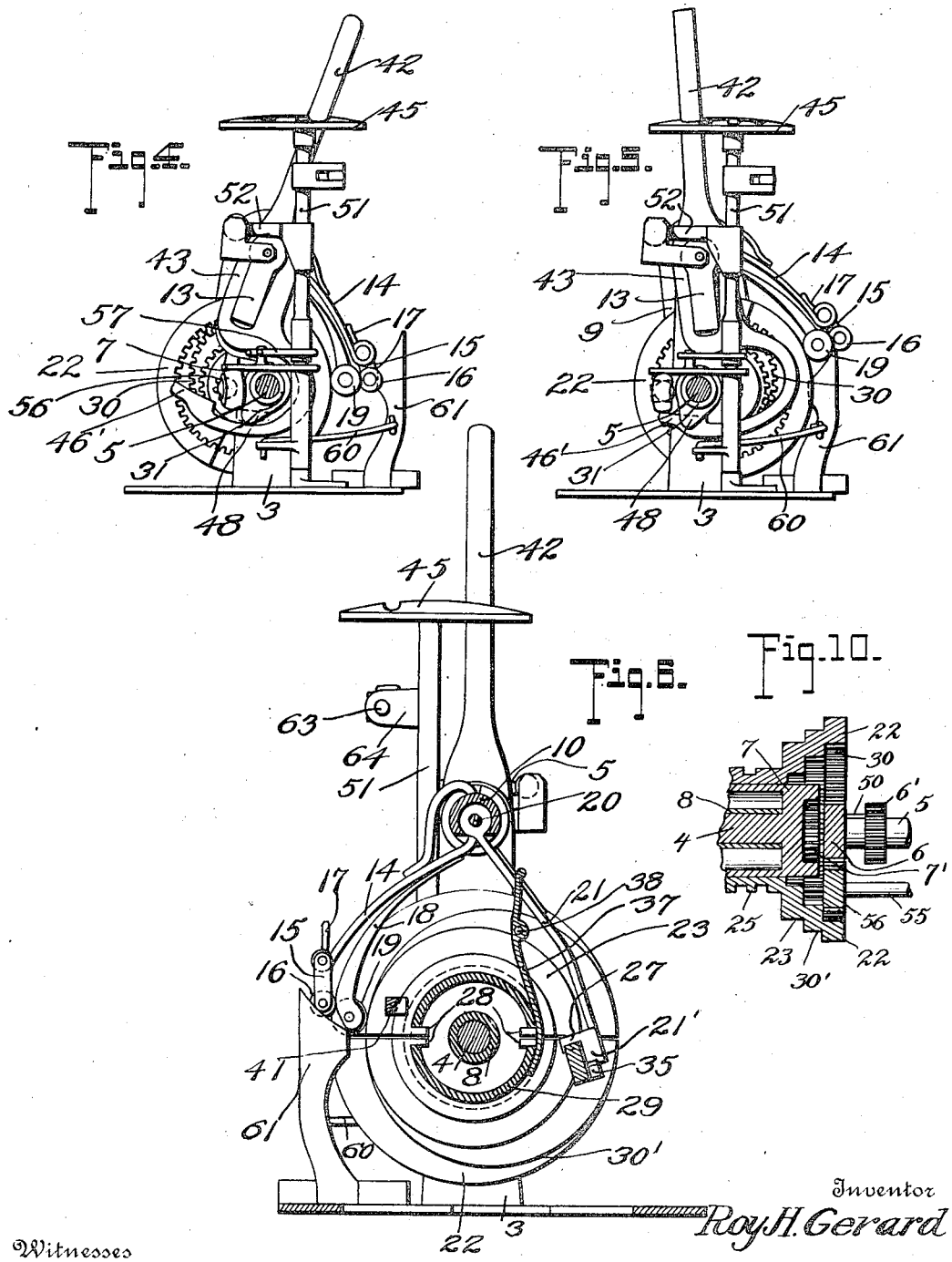

UNITED STATES PATENT OFFICE.

ROY HANMORE GERARD, OF BERKELEY, CALIFORNIA.

VARIABLE-SPEED-TRANSMISSION MECHANISM.

1,173,946.          Specification of Letters Patent.     Patented Feb. 29, 1916.

Application filed December 8, 1911. Serial No. 664,647.

*To all whom it may concern:*

Be it known that I, ROY HANMORE GERARD, a citizen of the United States, residing at Berkeley, in the county of Alameda and State of California, have invented certain new and useful Improvements in Variable-Speed-Transmission Mechanisms, of which the following is a specification.

The primary object of the present invention has been to devise a variable speed transmission mechanism especially adapted for use in connection with motor vehicles, but designed to be advantageously employed wherever machinery is to be run at various speeds and reversed, and wherein the arrangement and operation of parts is comparatively simple and conducive to highest efficiency.

A further object of the present invention has been to employ special controlling mechanism for the speed transmission mechanism by which transition of one speed to another may be effected without interruption of the operative connection between the drive and driven elements.

The control mechanism above referred to, as described and illustrated herein, is associated with construction embodying certain principles and features disclosed in my allowed application for patent, Serial Number 637,648, filed July 10, 1911, but said controlling means may be combined with transmission gearing of other types than that proposed in my application above referred to, as will be comprehended more fully on reference to the detailed description.

Among other objects of this invention, are the provision of variable speed gearing of the selective type in which any speed may be had without going through another speed; the arrangement of the gear elements whereby meshing of a lesser number of gears is required in the production of certain speeds, than necessary in the present types of change speed gearing, thus effecting a saving of considerable power when it is most valuable, as in going up-grades, for instance; the elimination of the necessity of intermeshing of gears when the direct drive or high speed is being used, and the provision of gears so situated as to be thrown into coöperation so that a number of the teeth of meshing gears will be engaged normally, giving an arc of contact between gears of greater length than is ordinarily produced in this class of mechanism, with the result that greater strength is secured at the point where the gears work together, where reduced, and the possibility of tooth breakage lessened so as to be practically negligible. In addition to the foregoing, the gear members of the present mechanism are so arranged as to eliminate the necessity of the usual countershaft and accompanying additional friction and noise, and further, the arrangement permits of meshing of the gears, several teeth at a time, and along the entire length of each tooth, this also reducing likelihood of tooth breakage to a minimum.

Many other features of construction will be presented hereinafter, along with their resultant advantages, and will be readily understood upon reference to the following description and to the accompanying drawings, in which—

Figure 1 is a perspective view of variable speed transmission mechanism embodying the invention. Fig. 2 is a side elevation of the same. Fig. 3 is a vertical longitudinal sectional view. Fig. 4 is an end view with the parts adjusted to obtain low speed. Fig. 5 is a view similar to Fig. 4, the adjustment of parts being for reverse speed. Fig. 6 is a vertical sectional view taken about on the line 6—6 of Fig. 2. Fig. 7 is a partial plan view bringing out more clearly the mounting of the reverse gear, the guide plate being partly broken away. Fig. 8 is a sectional view of a modified arrangement of gear elements. Fig. 9 is a broken view of the locking bar. Fig. 10 is a detail fragmentary section on the line 10—10 of Fig. 3.

Throughout the following detail description and on the several figures of the drawings, similar parts are referred to by like reference characters.

In the drawings, the variable speed gearing of the invention is shown mounted upon a conventional support 1, but it is to be understood that the general arrangement of the gearing will be such as to accommodate for the use of the same upon various types of machines including motor vehicles, etc. Spaced standards 2 and 3 support a driven shaft 4, and the standard 3 has a suitable bearing 3' in which a drive shaft 5 is journaled.

At one end, the shaft 5 carries a drive and clutch gear 6 in spaced relation to an auxiliary drive gear 6', and the other end of the shaft 5 will be connected for operation from any suitable source of motive power, such as an engine. On the end of the driven shaft 4 adjacent to the drive gear 6 is a clutch member 7 which is provided with teeth 7' so that the clutch member looks like an internal gear, though it does not have ordinarily the function of a gear. The shaft 4 is supported from the standards 2 and 3 by a tubular bearing 8 projecting laterally from the lower end of a double hanger 9, the latter in turn being formed at its upper end with a sleeve 10 which is journaled in bearings 11 at the upper ends of the standards 2 and 3.

In the sleeve 10 is a bushing 12 formed at one extremity with a depending arm 13 located at the outer side of the standard 3, the opposite end of the bushing 12 being formed with an outwardly and downwardly projecting rocker arm 14 which passes through an opening in the sleeve 10. At its lower portion, the arm 14 carries a short arm 15 pivoted at its upper end to the arm 14 and supporting a roller 16. An extension 17 projects upwardly from the pivoted member 15 and is curved laterally so as to engage the outer side of the rocker arm 14 under certain conditions of service. A spring plate 18 is attached at its upper end to the upper portion of the arm 14 and its lower end carries a roller 19, the purpose of which will appear fully hereinafter.

In the bushing 12 and portion of the sleeve 10 remote from said bushing is mounted a shifting rod 20 carrying a shifting arm 21, the latter projecting through a slot of sufficient length in the sleeve 10 to permit longitudinal movement of the arm 21 when shifted by proper instrumentalities for the purpose.

The driven mechanism of the transmission gearing not only includes the shaft 4 and clutch member 7, but supported adjacent to and preferably concentric with respect to the clutch member 7 is a gear member A which comprises the internal gears 22 and 23, and a sleeve 24. The sleeve 24 is provide dupon its outer surface with shifting cams 25 inclining in opposite directions and releasing cams 26 intermediate the shifting cams 25, all for coöperation with a projection 27 on the shifting arm 21, in the manner described in my previous application hereinbefore referred to. The releasing cam 26 is the same as set forth in my aforsaid application, it being designed to raise the arm 21 at the end of the step by step shifting movement of the sections of the gear member A. The lifting of the arm 21 by the cam 26 restores coöperation of the locking bar 31 therewith, said bar then holding the arm 21 in an inoperative position in relation to the shifting cams, as more fully set forth hereinafter. The gears 22 and 23, and the sleeve 24 are split longitudinally so as to provide corresponding semi-circular gear sections, the sections of the sleeve 24 being formed with longitudinal integral keys 28 which enter longitudinal slots in the supporting sleeve 29 between the members 7 and 9. The slots of the sleeve 29 provide guides for the keys 28, and the two parts of the sleeve 29 thus formed by the provision of the slots aforesaid are carried by or integral with the gear 7 and extend concentric to the bearing 8, the connection providing a support for the sleeve by the shaft 4 through the gear 7, as seen in Figs. 3, 8 and 10. The members 28 afford practically a feather and spline connection between the sleeve 29 and the sleeve 24 of the gear member A and said connection causes true relative sliding movement of the sections of the gear member when they are actuated by the shifting member 21 while the latter is in engagement with a predetermined set of the cams 25. The internal gears 22 and 23 have a gear path 30 leading from the pitch line of the teeth of one gear to the pitch line of the teeth of the other gear, said path 30 being, of course eccentric with respect to the axes of said gears. In like manner externally, the outer surfaces or perimeters of the gears 22 and 23 are connected by an exterior gear path 30', shown clearly in Figs. 2 and 6.

Normally a locking bar 31, pivoted at 32, is yieldingly held in coöperation with the shifting arm 21 by a spring 33 and is provided with notches 34 and a cam 35 coöperating with a projection 27 and lower extremity 21' of the arm 21, in the same manner as described in my application above referred to. This locking bar 31 normally holds the arm 20 out of engagement with respect to the shifting cams 25 until the arm 21 is moved longitudinally by the lever 43 a sufficient distance to permit the free extremity of the arm to pass through one or the other of notches formed in the bar 31, whereupon the projection 27 will be engaged directly with an adjacent shifting cam 25 for moving the sections of the sleeve 24 by a step by step movement to effect speed changing action of the gears 22 and 23 in respect to the driving machanism. This portion of my present invention is set forth in detail in my previous application and I therefore do not deem it necessary to describe the same with greater particularity. A spring or like member 36 is connected with the upper end of a locking lever 37 pivoted to the hanger 9 at 38, the lower end of said locking lever coacting with a locking rim 39 on the outer end of the shifting sleeve 28. A lateral arm 40 projects from the upper end of the lever 37 into engagement with the outer side of the shifting arm 21, and remains normally in such engagement during the shifting movement of the arm 21. It will be apparent therefore that the spring 36 tends to pull downwardly upon the arm 21 to throw the same into engagement with the cams 25, through the medium of the parts 37 and 40. Also coacting with the locking rim 39 is the lock plate 41, which is notched in the same manner as the equivalent part shown in my previous application identified hereinbefore, and the coöperation of the shifting arm 21 and parts 22, 23, 28, 31, 37, and associated members being substantially the same as similar parts described in the application aforesaid, will not be presented in detail herein except as necessary to present properly the operation of controlling mechanism, the construction of which will now be set forth.

At the end of the mechanism adjacent to the depending arm 13 are situated the main parts of the controlling means which comprises essentially an operating lever 42, the lower portion of which is formed with a yoke 43, and between the sides of the yoke, the arm 13 is received. A pivot 44 connects the yoke 43 and the lower end of the arm 13, and the upper end portion of the lever is arranged in coöperation with a guide plate 45. Projecting from the lower end portion of the lever 42 is an actuating arm 46 having a projection 46' adapted to enter a slot 47 in a tubular slide 48 which is mounted on a bearing 3' of the standard 3. A lateral extension 49 projects from the slide 48 and has a yoke 50 engaging the drive shaft 5 between the gears 6 and 6'. When the lever 42 is in a predetermined position, as at neutral, the projection 46' operatively connects the lever through the parts 48 and 50 with the shaft 5, whereby movement of the lever in a certain direction will shift the shaft 5 longitudinally, this being necessary, for instance, to disengage the drive gear 6 from the clutch member 7, the latter parts coöperating on the direct drive.

Adjacent to the lever 42, and preferably having its upper end journaled in the guide plate 45, is a vertical shaft 51 having an arm 52 engaging a yoke 53 secured to the adjacent extremity of the shifting rod 20. A sleeve 54 mounted rotatably on the shaft 51 has an arm 54' interlocking with the adjacent end of the reverse gear shaft 55, the reverse gear 56 being supported by the other end of said shaft. Spaced fingers 57 project from the shaft 51 and are adapted to engage with a projection 58 on the arm 54', the fingers being located on opposite sides of said projection. At its lower end, the sleeve 54 has an arm 59 which is connected by a rod 60 to a compensating lever 61 pivoted at its lower end at 62 and with its upper end arranged to coact with the roller 16 supported by the pivot member 15. The shaft 51 is adapted to be actuated by the lever 42 through a shifting slide 63, which is guided at one end by a plate 65 and is pivotally connected at its opposite ends to an arm 65 near the upper end of the shaft 51. Spaced projections 66 are carried by the slide 63 and are engageable by the lever 42 as the latter is moved back and forth in a slot 67 of the guide plate 45, said guide having a communicating slot 68 from a point between the ends of which extends still another communicating slot 69.

The foregoing sets forth in brief the structural features of the variable speed mechanism and controlling means therefor and it will be understood that, to obtain the highest speed, the direct drive is used by shifting the lever 42 from the neutral position in which it is shown in Fig. 7 into the slot 69 of the guide plate, such action causing the projection 46' of the arm 46, which projection is engaged with the slot 47, to move the slide 48 and yoke 50 longitudinally of the bearing 3' imparting similar movement to the drive shaft 5 so as to carry the drive gear 6 into engagement with the teeth 7' of the clutch member 7. To pass from high speed to the reverse, the lever 42 is moved into its neutral position in Fig. 7, and then forced to the closed end of the slot 68 of the guide plate 45, the first movement of the lever disconnecting the gear elements 6 and 7, and the second movement of the lever imparting a pivotal movement to the arm 13 and thus causing said arm, through its sleeve 10, to swing the hanger 9 and entire gear member A until the reverse gear 56 is meshed with the gear members 22 and 6, whereupon the driving of the shaft 4 is imparted through the gears 6, 56, and 22, all in mesh.

To pass from the reverse speed to low, it is only necessary to move the lever 42 from the slot 68 into the slot 67, said action swinging the gear member A bodily in the direction of the shifting arm 21 through the medium of the parts 13, 10 and rocker arm 14, the latter being engaged by the sleeve 10 at one side of the slot through which the arm 14 passes, in said operation.

The transition from low to second speed is readily effected by swinging the lever 42 from the low speed position to the opposite end of the slot 67, this movement causing the lever, (with its projection 46' still disengaged from the slot 47), to impinge against the inner projection 66 of the slide 63 moving said slide inwardly, thereby rocking the shaft 51. The said shaft 51 when operated as above, through its arm 52, causes longitudinal movement of the shifting rod 20 toward the lever until the arm 21 engages the inner cam 25, whereupon the sections of the gear member A are each moved step by step in the direction of the standard 3. During the shifting movement of the gear member A, the drive gear will pass from mesh with the gear 22 along the gear path 30 into mesh with the gear 23, the new speed being produced without any interruption of the connection between the driving and driven elements 4 and 5. Obviously, the reverse movement of the parts is incidental to the transition from the second to low speeds.

The auxiliary drive gear 6' comes into play when the parts are adjusted to the second speed and the transition is to the reverse speed, under which conditions the gears 22, 6', and 56 will be engaged. The functions of the gears 6 and 6' might readily be performed by a single gear elongated to the width of the distance between the remote sides of said gears 6 and 6'.

Additional speeds may be produced by merely supplying more of the internal gears forming a part of the member A, and accommodating the shifting mechanism thereto. Among the advantages of the present speed gearing are the following:

1. When using the low speed or the second speed only two gears are in mesh, saving considerable power just when it is most valuable, i. e., going up hill, for instance. Ordinarily there are four gears running, being two pairs.

2. When using the reverse there are only three gears in mesh, while the usual practice is to have five in use, there being then one set of two and one set of three.

3. When using the direct drive or high speed, not only are there no gears transmitting power but there are no gears in mesh whatever.

4. The change from low speed to second speed is gradual, as is also the change from second speed to low. This is of great value when carrying a heavy load, since it saves the machine from sudden shocks.

5. When changing from low speed to second speed or vice versa the gears are never out of mesh. This is of great advantage when carrying a large load since there are times when the uncoupling of the gears when carrying a large load would mean the loss of the advantage already gained. An instance is to be found in a motor truck climbing a hill, and when part way up finding it cannot proceed farther on the second speed.

6. There will never be a great deal of noise because there are so few gears in mesh. Some such devices make more noise when not driving than when in use. This machine is entirely disconnected when not transmitting power, thus saving wear and eliminating noise.

7. The absence of a counter-shaft eliminates the additional item of friction and increased noise, etc. A large number of sliding gear styles of automobile transmission mechanisms employ a counter-shaft.

Certain compensating means comprising the compensating lever 61, rocker arm 14 and plate 18 with the rollers 16 and 19, will now be described.

As before mentioned, the lever 42 is pivoted to the lower end of the arm 13, and through said arm is adapted to move the rocker arm 14 and member 18, the latter carrying the roller 19 which is adapted to engage with the peripheries of the gears 22 and 23, and also with the gear path 30', to insure the proper meshing of the drive gear 6 with the internal gears of the member A. The swinging of the gear member A bodily to secure the low and second speeds is accomplished by swinging movement of the arms 13 and 14, the latter having a bearing against the member A through the parts 18 and 19. When the mechanism is set for the low speed, the parts 14 and 18 are in the positions in Fig. 4, and maintain practically the same relative positions when the reverse speed is being used, as shown in Fig. 5, except that, in the latter instance, they are tilted upwardly at a greater angle.

The parts 14 and 18 maintain the above described relative positions when the second speed is being used also and when the drive gear 6 is passing from the gear 22 to the gear 23. When, however, the drive gear 6 leaves the gear 22, the arm 14 will be capable of slight movement with respect to the gear member A or the sleeve 10, this movement being had only when the lever 42 is out of the low speed end of the slot 67. At other times, the gears of the member A, by swinging over, compensate for the difference in diameter of said gears. When meshing the drive gear 6 and second speed gear 23, the pivoted member 15 comes into action with its roller 16 to fill the gap or space caused by passing of the roller 19 from the periphery of the gear 22 to the periphery of the gear 23, which is of smaller diameter. The arm 14 cannot swing out from the gear 23 without the pivoted member 15 through its roller 16 coming into contact with the curved upper end of the compensating lever 61, this causing said member 15 to press the arm 14 and plate 18 apart, as shown in Fig. 6, thereby taking up any loose play that would otherwise exist. It is apparent therefore that the gear member A is swung in one direction by shifting of the lever 42 and arm 14, the latter bearing against the gear member through the roller contact 19, the opposite movement of the swinging member being imparted by the abutting of the arm 14 with the sleeve 10 in a manner hereinbefore set forth.

When the reverse speed is desired, the movement of the lever 42 to the reverse slot always moves the entire gear member A to the same extreme distance on that side. The action described is necessary since the same reverse gear and drive gears are always used and their meshing relation renders necessary the same predetermined position of the parts. The compensating lever 61 is swung out of the way by the movement of the shaft 51 and the arm 59 exerting a pushing movement on the rod 60, the inoperative position of the lever 61 being shown in Fig. 2. Obviously, coöperation of the compensating lever 61 is not needed until the gear 23 is used in producing the second or intermediate speed and it is necessary to render the lever 61 operative at the last mentioned time in order that the gear member A may be maintained under the rigid control of the lever 42. If the member 61 were not provided, the gear member A would be free to move by gravity or by vibration, out of control when the drive gear 6 is moving away from the gear 23. If the operator were unable to control the movement of the swinging gear member A under the above conditions, the direct drive could only be produced by chance because the gear 23 might not assume a position properly concentric with respect to the gear 6, whereupon the gear 6 could not be engaged properly with the clutch member 7 because not alined therewith.

When the lever 42 is in its low speed position, the projection 46' is disengaged from the slot 47, and swinging of the lever 42 does not affect the position of the drive gear 6. When the lever 42 is in the position above mentioned, the drive gear 6 is locked from endwise movement by a lock member 70 which swings into a position engaging between the standard 3 and tubular slide 48. In using the direct drive or reverse speeds, the gear 6 is connected operatively with the lever 42 by reason of the engagement of the projection 46' in the slide 47. At all other times, the gear 6 is prevented from movement by the lock member 70.

The reverse gear shaft 55 is pivotally supported in a bearing 71 carried by a swinging arm 72 journaled on the sleeve 10, and a spring 73 yieldingly holds the reverse gear 56 in a position just out of mesh with the drive gear 6. The reverse gear 56 is not in operation except when the swinging gear member A is moved into a position in which the gear 22 engages the gear 56 and holds the latter in mesh with the gear 6 aforesaid, whereupon the reverse gear acts as an idler. The shaft 51 not only operates the compensating lever 61 but, through the members 57, 58 and 54', the reverse gear shaft 55 is moved longitudinally in its bearing 71 to follow up the gear 6. When the lever 42 is moved therefore to effect a change of speed, the gear 56 is also moved in anticipation of the new position to be assumed by the gear 6.

It is contemplated, of course, that the entire gearing hereinbefore described shall be housed by a casing of a suitable construction.

The guide plate 45 serves to hold the gears in mesh at certain times, as will be readily apparent and to prevent any damage to the gears in the speed changing operations, should the lever 42 be moved sharply with respect to the plate 45 without giving the gears a chance to mesh, a small dash-pot or equivalent device may be provided to retard such movement and insure proper coöperation of said gears.

It is not desired to be limited to the special type of swinging gear member A hereindescribed since, within the broader spirit of the invention, it is proper to employ a frame work which will hold the gears of different diameters which comprise the gear member, so that said gears may be moved in a straight line backward and forward in order to mesh the same with the drive gear. There would be possible disadvantages in the last mentioned construction, however.

In the modified construction in Fig. 8 of the drawings, the drive gear $6^a$ is adapted for direct engagement with the clutch element 7', to obtain the direct drive somewhat in the manner previously described, but associated with the gear $6^a$, is an auxiliary drive gear $6^b$, keyed to the former by its teeth. The gear $6^b$ is larger than the gear $6^a$ and is internally toothed for engagement with external teeth on the clutch member 7' by swinging of the gear member A by suitable means such as before described. In the arrangement now set forth the element 7' is truly a combined clutch and gear and when in mesh with the drive element $6^b$, the driven shaft 4' will be operated at a higher speed than is obtained by the direct drive when the parts $6^a$ and 7' are engaged. The fourth speed thus obtained is quite commonly employed in larger automobiles at the present time and is therefore highly advantageous.

It will be understood that the terms "drive" and "driven", as used herein, and in the claims hereto appended are purely relative because it is well known in this art that the driving and driven elements of transmission may be used in an opposite sense or changed, without detracting from the principle of operation and general efficiency of the machine.

Having thus described the invention, what is claimed as new is:

1. In variable speed gearing, the combination of a driving element, a driven member comprising change speed gears, and an operating device capable of shifting the driving element and of moving the change speed gears of the driven member whereby to effect changes of speed of the driven member.

2. In variable speed gearing, the combination of a driving gear, a driven member, operating means for coupling said driving gear directly with the driven member, a gear member composed of gears of different diameters and connected to the driven member, and means controlled by said operating means for moving said gear member to effect transition of the driving gear from one of the gears of the gear member to another of said gears.

3. In variable speed gearing, the combination of a driving gear, a driven member, operating means for coupling said driving gear directly with the driven member, a gear member composed of gears of different diameters and connected to the driven member, and means controlled by said operating means for swinging said gear member to effect transition of the driving gear from one of the gears of the gear member to another of said gears.

4. In variable speed gearing, the combination of a driving gear, a driven member, a gear member connected to one of the first mentioned members and composed of gears of different diameters, a common operating device for imparting relative movement to the driving and driven gears to couple the same, and for shifting the gears of the gear member into successive engagement with the other of the first mentioned members.

5. In variable speed gearing, the combination of a driving gear, a driven element adapted to be alined with said gear, means for shifting the driving gear to couple the same directly with the driven element, a gear member carried by the driven element and composed of gears of different diameters, and means controlled by said shifting means for also shifting said gear member to effect transition of the driving gear from one to another of the gears of the gear member.

6. In variable speed gearing, the combination of a driving gear, a driven element adapted to be alined with said gear, means for shifting the driving gear to couple the same directly with the driven element, a gear member carried by the driven element and composed of gears of different diameters, and a lever for shifting the gear member longitudinally and laterally with respect to the driving gear to couple the latter with the gears of the gear member.

7. In variable speed gearing, the combination of a driving gear, a driven element adapted to be alined with said gear, means for shifting the driving gear to couple the same directly with the driven element, a gear member carried by the driven element and composed of gears of different diameters, means for shifting the gear member bodily and laterally with respect to the driving gear to couple the latter with the gears of the gear member, and means directly controlled by the last mentioned means for imparting other relative movement to the gear member and driving gear to effect transition of the driving gear from one to another of the gears of the driving member.

8. In variable speed gearing, the combination of a driving element, a driven element, means for imparting relative movement to said elements to directly connect the same, a gear member connected to the driven element and composed of gears of different diameters, means for connecting the driving element directly with a selected one of the gears of said gear member, and means for effecting transition of the connection between the driving element and gear member from one to another of the gears of the latter.

9. In variable speed gearing, the combination of a driving element, a driven element, means for imparting relative movement to said elements to directly couple the same, a gear member connected to the driven element and composed of gears of different diameters, and means for moving the gear member laterally to connect any one of its gears with the driving element and for moving said gear member parallel to the axis of the driving element to effect transition of the latter from one to another of the gears of the gear member.

10. In variable speed gearing, the combination of a driving element, a driven element comprising a gear member composed of gears of different diameters, means for moving the gear member laterally of the driving element to couple the latter with any selected gear of the gear member, and means for moving the gear member parallel with the axis of the driving element to effect transition of the latter from one to another of the gears of the gear member.

11. In variable speed gearing, the combination of a driving element, a driven element in alinement therewith, means for coupling said elements directly together, a gear member connected with the driven element, and means for imparting movement to the gear member independently of the driven element to couple the driving element with said gear member.

12. In variable speed gearing, the combination of a driving element, a driven element, means for coupling said elements directly together, a gear member rotatable with the driven element and coaxially mounted thereon, means for moving the gear member laterally with respect to the driving element to couple the same together, and means for sliding the gear member on the driven element to change the relative positions of said gear member and driving element.

13. In variable speed gearing, the combination of a driving element, a driven element, means for coupling the same for simultaneous movement, a gear member coaxially mounted on the driven member and composed of gears of different diameters, and means operated by said coupling means for imparting movements to said gear member to couple its gears with the driving element and to effect transition of the driving element from one gear to another of those of the gear member.

14. In variable speed gearing, the combination of a driving element, a driven element, means for imparting relative movement to said elements to directly connect the same, a gear member mounted on the driven element for rotation therewith and composed of sections, and means for imparting movement to the sections of the gear member to change the relative positions of the gear member and driving element.

15. In variable speed gearing, the combination of a driving element, a driven element, means for imparting relative movement to said elements to directly connect the same, a gear member mounted on the driven element for rotation therewith and composed of sections, means for imparting movement to the sections of the gear member to change the relative positions of the gear member and driving element, and for moving said gear member bodily to engage the same with the driven element.

16. In variable speed gearing, the combination of a driving element, a driven element, means for moving said elements relatively to directly couple the same, a gear member connected to the driven element and comprising gears of different diameters, means for swinging the driven element and its gear member to engage a predetermined gear of the latter with the driving element, and means for sliding the gear member while engaged with the driving element to effect transition of the driving element from one gear to another of the gear member.

17. In variable speed gearing, the combination of alined driven and driving shafts, clutch means for connecting said shafts directly, a gear member carried by the driven shaft and composed of gears of different diameters divided into sections, means for swinging the driven shaft and gear member bodily to engage a selected gear of the latter for actuation by the driving shaft, and means for imparting step by step movement to the sections of the gear member to effect speed changing movement relative to the driving shaft.

18. In variable speed gearing, the combination of a driving shaft having a driving gear, a driven shaft, means for engaging the driving gear directly with the driven shaft, a gear member connected with the driven shaft and composed of gears of different diameters, and means operable by the first mentioned engaging means for shifting the gears of the gear member selectively into and out of engagement with the driving gear.

19. In variable speed gearing, the combination of a driving element, a driven shaft, means for coupling the driven shaft and driving element directly together, a gear member on the driven shaft comprising gears of different diameters, means for shifting the gear member to place a selected one of its gears in an operative position with respect to the driving element and operable by the coupling means first mentioned, and means also operable by said coupling means for successively engaging the gears of the gear member with the driving element.

20. In variable speed gearing, the combination of a driven shaft, a driving element therefor, an operating lever for shifting the driving element into direct connection with the driven shaft, a gear member on the driven shaft comprising gears of different diameters coaxial with said shaft, shifting mechanism operable by said lever for positioning the gears of the gear member for operative engagement by the driving element, and means operable by the lever for moving the gear member bodily to carry a selected gear thereof into engagement with the driving element.

21. In variable speed gearing, the combination of a driving element, a driven shaft alined therewith, a sliding gear member on the driven shaft rotatable therewith, and composed of gears of different diameters, means for shifting the gear member on said shaft, a lever controlling said shifting means, and connections between said lever, the driving element, the sliding gear member, and associated parts.

22. In variable speed gearing, the combination of a driving element, a driven element in alinement with the driving element, an auxiliary driving element connected with that first mentioned, the driven element comprising a combined clutch and gear member arranged for direct clutching engagement with the driving element and having means to establish a gear connection with the auxiliary driving element and a reversing gear intermediate the driving and driven elements.

23. In variable speed gearing, the combination of a drive shaft, a driven shaft, drive gearing on the drive shaft, and driven gearing on the driven shaft, a reverse gear, an axis for said reverse gear arranged parallel with the axis of the drive shaft, and a lever controlling relative movement of the drive and driven shafts to cause coöperation of the driving and driven gearing, and to cause coöperation of the driven gearing with the reverse gear aforesaid.

24. In variable speed gearing, the combination of a depending hanger provided with a bearing, a driven shaft supported in said bearing, a driven member on said shaft, a drive shaft, a driving member on said drive shaft, means for swinging the hanger aforesaid to control certain coöperative engagement between the drive and driven members, and for causing relative longitudinal movement of the drive and driven members to effect their coöperative engagement between same.

25. Variable speed gearing comprising driving and driven elements, the latter comprising a plurality of gears, a reverse gear adapted to engage the driving element; and means for moving the driven element bodily to engage a selected one of the gears of the same with the driving element or with the reverse gear.

26. In variable speed gearing, the combination of a driving element, a driven member comprising a plurality of change speed gears, and an operating device connected with said parts for communicating longitudinal movement to the driving element and lateral movement to the gears of the driven member in effecting transition from one speed to another.

27. In variable speed gearing, the combination of a driving gear, a reversing gear arranged with its axis parallel to the driving gear, a driven member comprising change speed gears, an operating device connected with the driving and reversing gears and with the driven member for imparting relative movements to the driving and reversing gears and for imparting lateral movement to the driven member, to effect transition from one speed to another.

28. In variable speed gearing, the combination of a drive gear, a driven member comprising a plurality of change speed gears, and an operating lever associated with said parts and connected to impart axial movement to the drive gear and to impart swinging movement to the change speed gears in a plane transverse to that of the movement of the drive gear, whereby to effect transition from one speed to another.

29. In variable speed gearing, the combination of a driving gear, a driven member comprising a plurality of change speed gears arranged concentric to one another and adapted to be engaged with the driving gear, operating means for the driven member including an arm and a rolling contact member between said arm and the driven member, and means other than the arm for supporting said contact member.

30. In variable speed gearing, the combination of a drive gear, a driven member composed of a plurality of concentric change speed gears, a gear path leading from the pitch line of one change speed gear to the pitch line of another change speed gear, means for imparting relative movement to the change speed gears and drive gear to effect transition from one speed to another, and means for taking up play incidental to travel of the drive gear from the gear path aforesaid and coöperating with the change speed gears, the last mentioned means comprising a manually controlled arm and a yieldingly supported roller intermediate the arm and the driven member.

31. In variable speed gearing, the combination of a drive gear, a driven member comprising change speed gears, and means for causing coöperation of said parts including an operating lever, a shaft, an arm projecting from said shaft, and rolling members between said arm and one of the first mentioned parts.

32. In variable speed gearing, the combination of a drive gear, a driven member composed of a plurality of change speed gears, and operating means for effecting changes of speed by coöperation of said parts and including a shifting device for imparting axial movement to the change speed gears and for moving the latter gears laterally.

33. In variable speed gearing, the combination of a drive gear, a driven member composed of a plurality of change speed gears, and operating means for effecting changes of speed by coöperation of said parts and including a shifting device for imparting axial movement to the change speed gears and for moving the latter gears laterally, and also including means for imparting axial movement to the drive gear.

34. In variable speed gearing, the combination of a drive gear, a driven member composed of sections comprising a plurality of change speed gears, and operating means for moving said driven member laterally and for effecting a step by step movement of the sections of the driven member to move the latter axially to different positions in relation to the drive gear.

35. In variable speed gearing, the combination of a drive gear, a driven member composed of sections comprising a plurality of change speed gears, operating means for moving said driven member laterally and for effecting a step by step movement of the sections of the driven member to move the latter axially to different positions in relation to the drive gear, and means coöperating with a part of said operating means for shifting the drive gear longitudinally.

36. In variable speed gearing, the combination of coöperative gear members, one of said gear members consisting of a plurality of gears of different diameters, a shifting device connected with one of the gears for effecting speed changing movement of the same, a shifting member for rendering the shifting device operative, means on the shifting device for releasing the same from the shifting member after the speed changing operation has been completed, and an operating device for actuating the other gear member and controlling the operation of the shifting member aforesaid.

37. In variable speed gearing, the combination of coöperating gear members, means for shifting one of said members to effect speed changing movement of the same and comprising a device normally inoperative, a shifting member for rendering said shifting device operative, means on said shifting device for releasing the same from the shifting member when a speed changing operation is completed, locking means normally preventing speed changing movement of the movable gear member and coacting with the shifting member, and an operating device for actuating the other gear member and controlling the operation of the shifting member aforesaid.

38. A first and a second shaft, a shiftable gear secured to the first shaft, an internal rim gear member secured to the second shaft and having alternately arranged concentric and eccentric sections coöperative with said shiftable gear, and means for shifting said shiftable gear, together with means for holding said shiftable gear continuously in mesh with the respective gear section.

In testimony whereof I affix my signature in presence of two witnesses.

ROY HANMORE GERARD.

Witnesses:
MARY H. GERARD,
MARIE GERARD.